(No Model.) 3 Sheets—Sheet 1.
T. D. McGRATH.
CORN HARVESTING MACHINE.
No. 594,418. Patented Nov. 30, 1897.
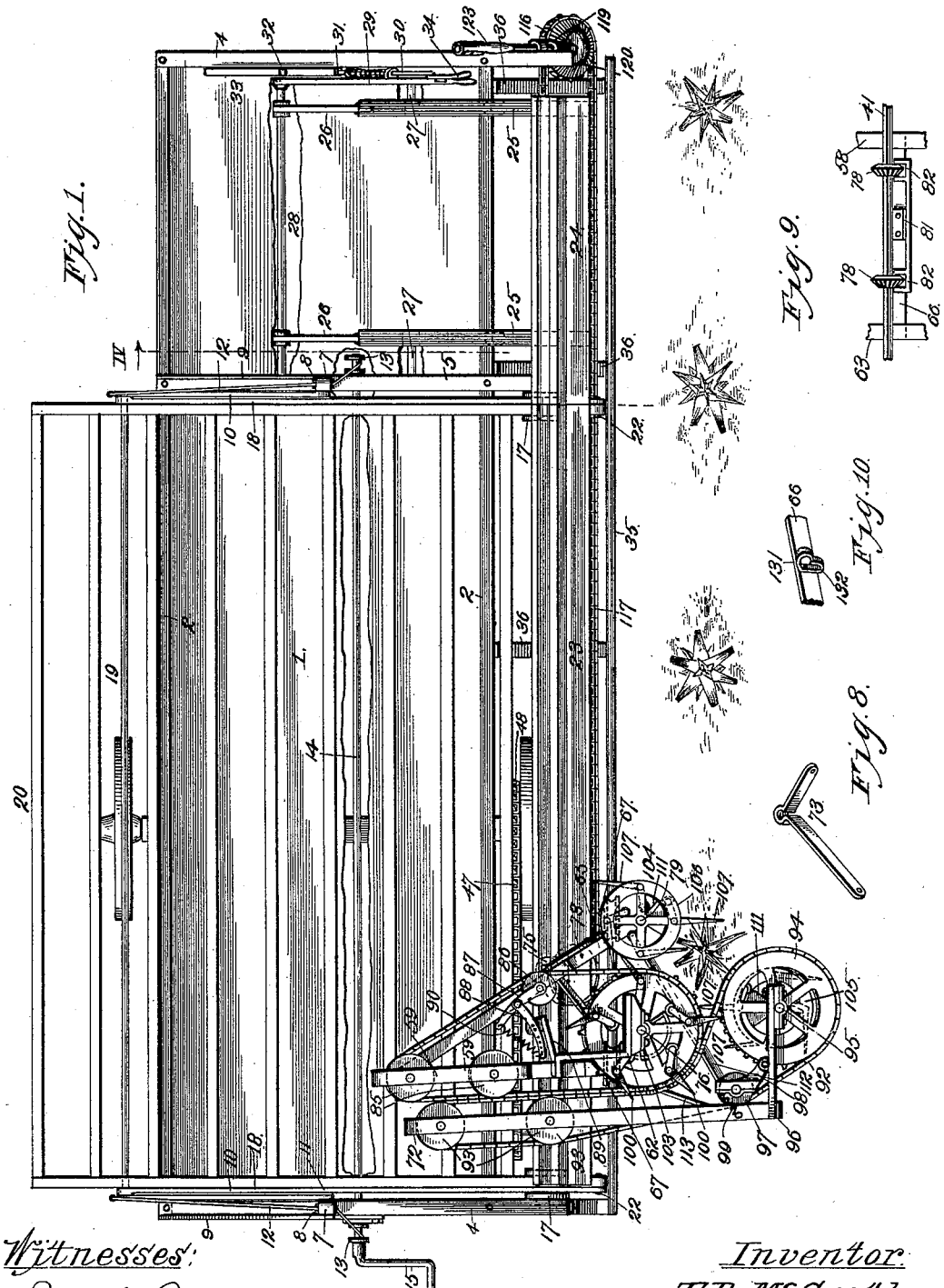
Witnesses:
M. R. Remley.
G. Y. Thorpe.
Inventor:
T. D. McGrath.
by Higdon & Higdon
Attys.

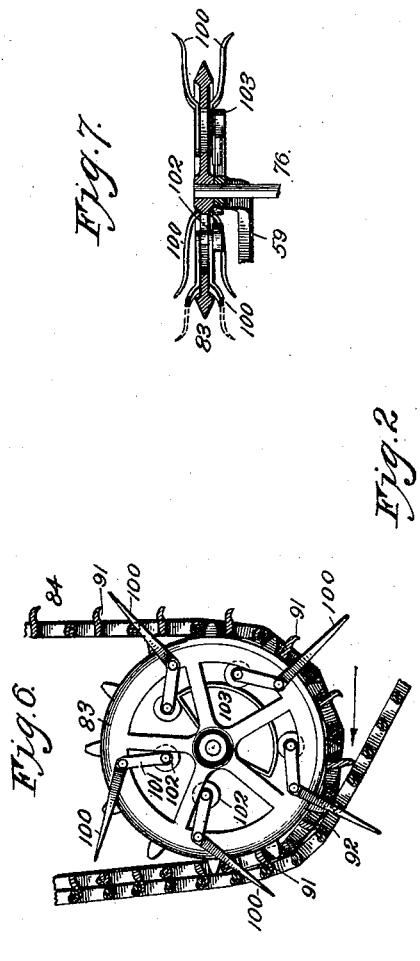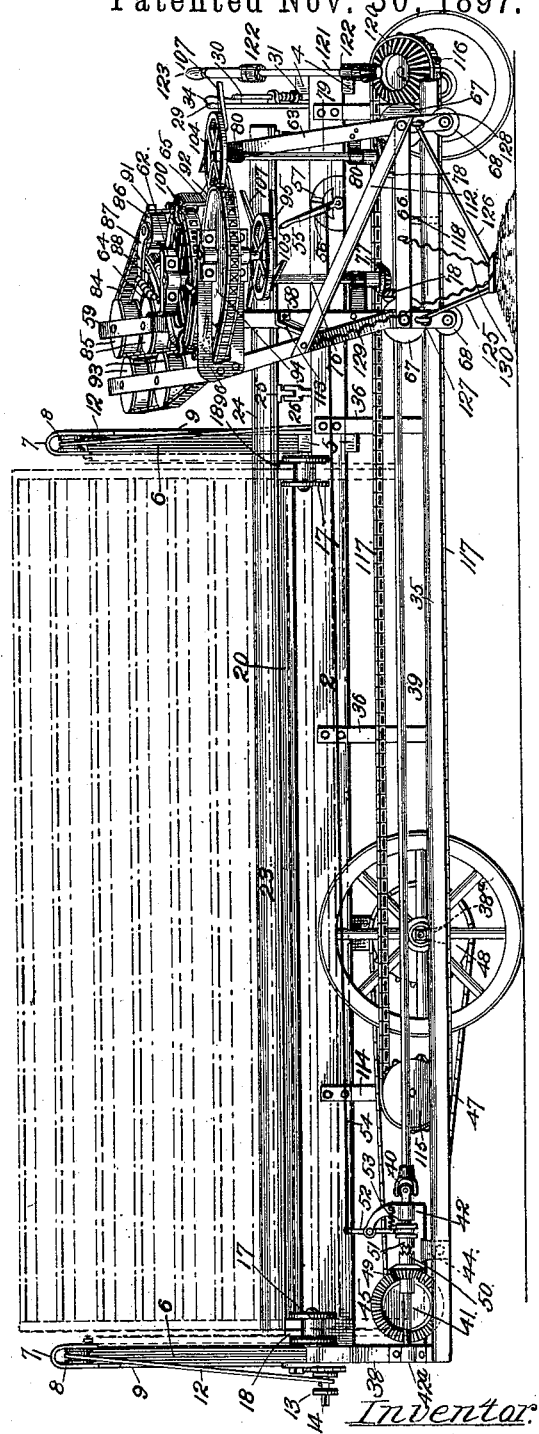

(No Model.) 3 Sheets—Sheet 3.

T. D. McGRATH.
CORN HARVESTING MACHINE.

No. 594,418. Patented Nov. 30, 1897.

Witnesses:
M. R. Remley
G. B. Trotter

Inventor:
T. D. McGrath
by Hixson & Hixson
Attys.

THE NORRIS PETERS CO., PHOTO-LITHO., WASHINGTON, D. C.

UNITED STATES PATENT OFFICE.

THOMAS D. McGRATH, OF MUNCIE, KANSAS.

CORN-HARVESTING MACHINE.

SPECIFICATION forming part of Letters Patent No. 594,418, dated November 30, 1897.

Application filed November 16, 1896. Serial No. 612,348. (No model.)

*To all whom it may concern:*

Be it known that I, THOMAS D. MCGRATH, of Muncie, Wyandotte county, Kansas, have invented certain new and useful Improvements in Corn-Harvesting Machines, of which the following is a full, clear, and exact description, reference being had to the accompanying drawings, forming a part thereof.

My invention relates to corn-harvesting machines; and it consists in certain novel and peculiar features of construction and combinations of parts to be hereinafter described and claimed.

The object of the invention is to produce a machine of this character whereby the corn will be automatically cut and deposited transversely upon a tilting rack, from which it may be dumped in an upright position against a wire stretched across a field or other support.

In order that the invention may be fully understood, I will proceed to describe it with reference to the accompanying drawings, in which—

Figure 5:
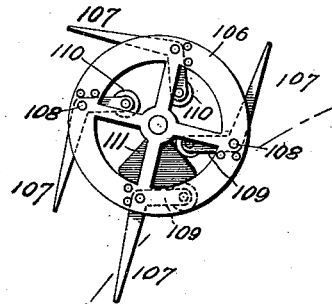
Figure 3:
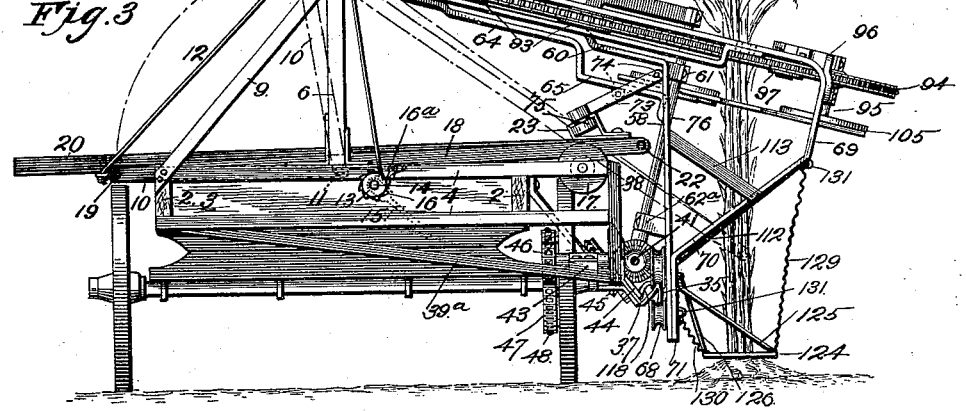
Figure 4:
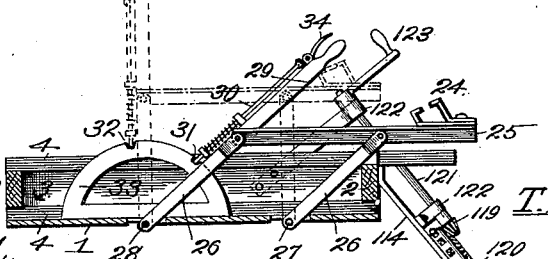

Figure 1 represents a plan view of a corn-harvesting machine constructed in accordance with my invention. Fig. 2 represents a side view of the same with the corn cutting and gathering frame shifted to a different position from that shown in Fig. 1. Fig. 3 represents a rear view of the machine. Fig. 4 represents a cross-section taken on the dotted line IV of Fig. 1. Fig. 5 represents a top plan view of one of the reels forming a part of the corn cutting and gathering frame mechanism. Fig. 6 represents a view, partly in plan and partly in horizontal section, of a part of said corn cutting and gathering frame mechanism. Fig. 7 is a cross-section of the same with the engaging chains omitted. Fig. 8 is a detail perspective view of the swiveled bracket forming a part of said frame. Fig. 9 is a detail view of a part of said frame, and also shows a squared shaft and a pair of adjustable cog-wheels thereon. Fig. 10 is a perspective view of part of the machine, in order to show clearly the construction of the brackets for engagement with the chains of the stalk-cutting knife.
Similar reference-numerals refer to corresponding parts in all the figures, in which—

A rectangular frame or body consists of the bottom 1, the side bars 2, and the end bars 3. At its opposite ends, above and below, said frame is provided with the transverse bars 4, all of said bars preferably, with the exception of the foremost lower one, projecting some distance beyond one side of the frame. The frame is also provided with the similar transverse bars 5 a suitable distance from its front end, and said bars 5 also preferably project to the same side of the frame—at least the upper one should.

About the middle of the frame and upon the topmost cross-bar 4 at its rear end and the topmost cross-bar 5 are erected the standards 6, and secured to their upper ends are the inverted-U-shaped brackets 7, wherein are revolubly mounted the grooved pulleys 8. The standards 6 at the side from which the most strain is applied are braced by the inclined bars 9.

10 designates bars somewhat shorter than the standards, which are mounted pivotally at their lower ends, as at 11, to the inner sides of said bars 4 and 5, carrying the standards, and 12 designates cords or ropes, which are guided over the pulleys 8 and are attached at their opposite ends to the free or outer ends of the bars 10 and to the winding-drums 13, mounted rigidly upon a longitudinal shaft 14, arranged below the plane of said topmost bars 4 and 5. Said shaft is squared at one end in order that it may be conveniently engaged or disengaged with a wrench or crank-handle 15. By rotating said shaft in the proper direction said ropes are wound upon said drums and the bars 10 elevated to the position shown in dotted lines, Fig. 3. In order to hold them in any desired position of adjustment, a ratchet-wheel 16 is also mounted upon said shaft and engaged by a spring-actuated pawl 16ᵃ or its equivalent.

17 designates a pair of grooved guide-wheels which are rotatably mounted at the inner sides of the topmost bars 4 and 5 externally of the frame, and 18 a pair of bars which engage said pulleys and are pivoted at their opposite ends to the bars 10, hereinbefore described, by the longitudinally-extending pivot-rod 19, said rod therefore bridging the entire distance between one of said bars 18 and the other.

20 designates a skeleton rack of the usual construction. It is pivoted at one end, as at 22, to the bars 18 and rests at such end in the grooved guide-rollers 17. At its opposite ends it fits snugly between the bars 18 and rests upon the longitudinally-extending rod 19.

23 designates a longitudinally-extending track which is mounted upon the rack near its pivoted end, and is constructed, preferably, of two members bolted together and to said rack, and having their opposite sides or tread-surfaces inclined upwardly and inwardly and flanged toward each other at their upper ends, so as to form in effect a grooved guide-track.

24 designates a second and independent guide-track which at times forms in effect an extension of said grooved guide-track, and said extension is mounted rigidly upon the transverse and horizontal bars 25. Said bars are pivotally mounted upon rock-arms 26, one set of said rock-arms being mounted at their lower ends upon rigid stub-shafts 27, and the other set being mounted rigidly upon a longitudinally-extending shaft 28, suitably journaled. In order to manipulate the said shaft 28, and thereby shift the position of the track-section 24, I employ a lever 29, mounted at its lower end upon said shaft and provided with a spring-actuated dog or rod, which engages the notch 31 or a notch 32 in the sector 33, secured to the frame or body of the machine. Thus it will be seen by swinging said lever back or forth the track-section is moved inwardly from its normal position in alinement with the track-section 23 or outwardly to its normal position, all the while keeping its base in a horizontal plane. When it is desired to retract said dog from the notch 31 or the notch 32, it is only necessary to compress the handle 34 in the customary manner.

35 designates a longitudinal track which extends parallel with the track 23 and at the same side of the machine. It, however, is some distance outward of said track 23 and is in a much lower plane—in fact, is arranged in a plane below the axle of the rear wheel—the wagon-frame hereinbefore described being of course mounted upon wheels in the customary manner. The said track is secured in any suitable manner to the lower ends of the downwardly and inwardly extending brackets 36, secured to the side of the frame, (see Fig. 2,) and also is provided with an arm 37 at its rear end, which is secured to the vertical bar 38, (see Fig. 3,) carried by the rear cross-bars 4. The lower end of said bar is also braced by the obliquely-extending bar 39ª. The front end of the track-rail may also be braced in a similar manner; but it would confuse the drawing to attempt to illustrate it in this connection. The track-rail is still further supported by means of the bracket 38ª, secured at its upper end to the end of the rear axle. (See Fig. 2.)

Arranged above, parallel with, and inward of the rail 35 is a longitudinally-extending shaft 39, preferably rectangular in cross-section and journaled or supported in any suitable manner. At its rear end it is universally coupled, as shown at 40, to the front end of the short alined shaft 41, which shaft is journaled in a bracket 42 and a boxing 42ª, secured to the vertical bar 38, as shown clearly in Fig. 2.

43 designates a boxing which is mounted in a recess in the oblique brace-bar 39ª and forms a part of the bracket 42. The other end of said bracket is preferably supported by means of an arm 44, which extends downwardly and forwardly and is secured to the track-rail 35, as shown in Fig. 2 by dotted lines. A short transverse shaft is journaled in said boxing 43 and carries at one end a small sprocket-wheel 46, connected by a chain 47 with a large sprocket-wheel 48, secured rigidly to the inner side of the rear wheel at the corresponding side. At its outer end said shaft carries the bevel-gear 45, meshing with the pinion 49, mounted rotatably upon the cylindrical shaft 41 and provided with a clutch-section 50, adapted to be engaged at the will of the operator by the clutch member 51, mounted to slide upon but not to rotate independently of said shaft. Said clutch member is annularly grooved and is engaged by the lever 52, pivotally mounted upon an arm of the bracket 42. A retractile spring 53 connects said arm and said lever and tends to hold the clutch member 51 out of engagement with the clutch member 50. The upper end of the lever 52 is connected by a cord 54 with the lever 55, mounted near the front end of the frame and formed of spring material, so that it may be engaged with and hold its position in a notch 56 or a notch 57 of a sector or plate secured to the frame. When the lever 55 engages the notch 56, the clutch member 51 is out of engagement with the clutch member 50, and consequently the latter rotates loosely upon the shaft 41. When the lever 55 engages the notch 57, said clutch members are engaged and motion is imparted to the shaft 39 through the medium of the rotating pinion 49.

Referring now to the frame which carries the corn cutting and gathering mechanism, 58 designates a vertical standard which is formed at its upper end with an inwardly-projecting and upwardly-slanting loop 59. It is also formed with a depression, preferably as shown at 60, for a purpose which will be hereinafter made apparent, and at the junction of the depressed portion of the loop with the standard it is provided with a bearing-arm 61, and above the same and above the upper side of the loop a second bearing-arm 62 is secured to said loop.

63 designates a second standard which is arranged in the same vertical plane as the standard 58, and said standards are considerably nearer together than the foremost cross-bars 4 and 5. Said standard is provided also at its upper end with the inwardly-extending arm 64, and said arm slants upwardly and also rearwardly and is secured at its inner end to the under side of the loop 59, as shown in Fig. 3. The arm 64 is also formed with a depression 65 at its junction with the standard 63, for a purpose which will also be hereinafter explained. Said standards, near their lower ends, are braced by the bar 66, and consequently a strong and substantial structure is produced. Near the lower ends of said standards and at their inner sides are mounted the grooved wheels or rollers 67, which rest upon the track 35, and below said wheels or rollers are a second pair of wheels or rollers 68, which engage the under side of said track-rails. It will be noticed in this connection that the grooves of said wheels are of width to permit of a limited amount of lateral play upon the track. This is to accommodate vibration and also for another and the principal purpose. This will be hereinafter referred to.

69 designates a third standard. This is arranged rearward of and a suitable distance outward from the standard 58. It comprises a substantially upright portion numbered 69, and a downwardly, inwardly, and forwardly inclined portion 70, which is bent at its lower end to form the vertical portion 71, secured to the standard 58 and preferably by the same bolts which form the journals for the rollers 67 and 68 at the inner side of said standard. The standard 69 at its upper end is also provided with an inwardly-projecting and upwardly-slanting loop 72, which extends parallel with the loop 59 and in the same plane. To prevent the said frame swinging inwardly or outwardly, I employ an approximately V-shaped bracket 73, pivotally mounted at its upper ends, as at 74, to operate in a vertical plane to the standard 58 and the depressed portion 65 of the standard 63 and carrying a track-roller 75 at its lower end, which travels between the walls of the track 23 or its continuation 24. In order to prevent the accidental movement of said roller upwardly from between the walls of said track, the latter are flanged, as explained, and consequently overlap said roller and hold it reliably in position.

76 designates a shaft which is journaled in bearing-arms 61, 62, and 62$^a$, projecting from the standard 58, (see Figs. 2 and 3,) and extends at a right angle to the plane of the loop 59. Mounted upon its lower end is a bevel-gear 77, meshing with a similar bevel-gear 78 upon the rectangular shaft 39. A similar shaft 79, journaled at its upper and lower ends in bearings 80, projecting from the standard 63, is also provided at its lower end with a bevel-gear 77, meshing with a similar bevel-gear 78 upon the rectangular shaft 39.

As the frame is adapted to be adjusted longitudinally of the machine, it is necessary that the cog-wheels 78 be moved with it, so as to keep them always in engagement with the wheels 77. To accomplish this, I employ a bracket 81, (see Fig. 9,) secured to the inner side of the bar 66 and provided with forked ends 82, which embrace the opposite sides of said gear-wheels 78 and consequently move them back and forth with the frame without interrupting the rotatable movement imparted to them by the revolving shaft.

83 designates a sprocket-wheel mounted upon the shaft 76 between the bearing-arms 61 and 62. It is engaged by a sprocket-chain 84, which also engages grooved guide-pulleys 85, journaled in the loop 59. It is also engaged by a tension-roller 86, carried by a lever 87, mounted upon an arm 88, and said arm is mounted upon a bracket 89, projecting from the loop portion of the standard 58. (See Fig. 1.) The opposite ends of said lever and said arm 88 are connected by a retractile spring 90, whereby the roller is held with a yielding pressure against the chain to keep it taut and yet to accommodate any unusually large cornstalk or a plurality of cornstalks passing through the machine simultaneously in a manner to be presently explained. Said chain, at the middle of each link, is provided with a hook-arm 91 to engage each alternate link of a chain 92, as illustrated most clearly in Fig. 6. Said chain 92 engages the grooved guide-rollers 93 of the loop 72, which are so arranged with relation to the rollers 85 that the inner sides of said chains shall lie one against the other and the hooks of one chain shall engage alternate links of the other. The opposite end of said chain 92 engages the sprocket-wheel 94 upon the short shaft 95, journaled in bearings carried by the U-shaped bracket 96, which bracket is secured to the standard 69. Said wheel 94 occupies the same plane as the wheel 83 and is arranged a sufficient distance outward of the latter to accommodate a plurality of cornstalks passing between them, as shown clearly in Fig. 1.

In order to hold the chain 92 at the proper tension, I mount the tension-roller 97 in an arm 98, pivoted to the U-shaped frame 96, and connect the free end of said arm to the upper portion of the standard 69 by means of a retractile spring 99. (See Fig. 1.)

To prevent any possible chance of the chains 84 and 92 becoming disengaged, which might possibly take place owing to the fact that they must not be too tight, because the cornstalks must pass between them, I employ a series of guard-arms 100, which embrace loosely the upper and lower sides of said chains at times and are pivotally mounted upon the sprocket-wheel 83. Said arms are provided with extensions 101, carrying rollers 102 for engagement with a segmental guide 103, secured rigidly to or projecting from the lower bearing-bracket of the shaft 76. By this arrangement (seen most clearly in Figs. 6 and 7) it is apparent that just at the time one or a bunch of cornstalks enter the converging space between the chains 84 and 92, as shown by arrow, one of the forked arms projects from the rear and bears against the corn stalk or stalks and forces it or them rearward with an unyielding pressure, owing to the fact that its roller 102 is in engagement with the segment 103 and cannot move farther inward. The segment is of such size and disposition that one of the guard-arms is never released by the segment until the guard-arm immediately in the rear has come into engagement with said segment. Consequently one of said arms is always embracing loosely the upper and lower sides of said chains where they extend together around the sprocket-wheel 83. In order to feed the cornstalks positively and reliably into the converging space between said chains, I employ a pair of reels of similar construction. One, 104, is mounted upon the upper end of the shaft 79 and the other, 105, upon the upper end of the shaft 95. The detail construction of each is as follows:

106 designates a wheel provided with a plurality of fingers 107, pivoted, as at 108, to the under side of the wheel. Said fingers at their opposite ends are provided with arms 109, projecting from the fingers at angles of about eighty degrees, and carrying rollers 110 at their ends, which are adapted successively to come into contact with the cam 111, mounted upon or projecting from a bearing or other immovable portion of the frame in the path of said rollers, as shown most clearly in Figs. 1 and 5. The cams 111 of said reels are so disposed relatively that the fingers of one reel will engage the cornstalks alternately with respect to the fingers of the other reel—that is to say, one finger of a reel will engage the corn after being previously positioned by engagement of its roller with the cam, and then, just as said finger is about to release the corn and become disengaged from its cam, the finger of the other reel, just previously positioned by its respective cam, will come into engagement with the corn and push it rearwardly into the space between said chains, and at the same time the stalk or stalks will be severed by engagement therewith of the upwardly, outwardly, and rearwardly extending knife 112, said knife being so disposed as to facilitate and make more positive and reliable the cutting operation. The knife is secured to the frame, as shown. Immediately after the cornstalks are grasped by said chains and are cut by said knife the roller of said second reel moves out of engagement with its cam and permits said finger to swing to an inoperative position, and consequently relieve the corn of unnecessary friction or pressure. The corn, grasped tightly and reliably between the chains, is conveyed by them transversely over the rack, and is discharged from between them in approximately a horizontal position, owing to the fact that the butts or lower ends of the stalks as they make the turn around the sprocket-wheel 83 strike against the deflecting and brace bar 113 and are tilted approximately to the inclined position of the rack shown in dotted lines, Fig. 3, so that when released by said chains they drop transversely and horizontally upon the rack 20, as will be readily understood. After sufficient corn has been automatically piled by this cutting and gathering mechanism upon the rear end of the rack it must be moved forward slightly, and this I accomplish by mechanism constructed and arranged as follows:

114 designates a bracket depending downwardly and outwardly from a side bar of the machine, and 115 an obliquely-arranged sprocket-wheel journaled thereon. At the front end of the machine a similar sprocket-wheel 116 is journaled in a suitable manner and is connected to the sprocket-wheel 115 by a chain 117, which chain is connected by an arm 118 to the lower part of the corn cutting and gathering frame, so that as said chain is moved back and forth the frame must move with it. To operate said chain, I employ a pinion 119, meshing with a bevel-gear 120, formed integral with the front sprocket 116. Said pinion is mounted upon the lower end of an oblique shaft 121, journaled in bearings 122, secured to the bracket 114 of the front sprocket-wheel and to the front end of the frame. Said shaft is provided with a crank-handle 123, the operation of which obviously imparts motion to the chain, and consequently adjusts the said frame forwardly or rearwardly.

In order to cut the cornstalks close to the ground and thereby render the usual after-work of cutting down the projecting stalks unnecessary, I employ a horizontal and obliquely-arranged knife 124 and connect its outer and inner ends, respectively, with the lower ends of the rods 125 and 126, the upper end of the rod 125 being swiveled, as at 127, to the standard 58 of the frame, and the upper end of the rod 126 being swiveled, as at 128, to the standard 63. The outer end of the knife is also connected by the chain 129 with the standard 69 at its junction with the oblique or inclined portion 70, and the inner end of the knife is connected by a chain 130 to the bar 66 of the frame. The connection of the upper ends of said chains with said frame is through the medium of brackets 131, having a large opening through which the chain is adjustably passed and a narrow communicating opening 132 into which links of said chains are fitted edgewise, so as to hold them from slipping at any point to which the knife may be adjusted—that is to say, when a link of one of the chains is fitted edgewise in the narrow opening the adjacent links, disposed at right angles to the one engaging the opening, will bear against the opposite sides of the brackets and prevent the chain slipping through under the strain imposed upon the knife by its engagement with the cornstalks. By this arrangement it is obvious that a simple, strong, and durable stalk-cutting-knife mechanism is easily and cheaply secured to said frame. If it is not needed, the farmer can easily and quickly remove it and replace it again when necessary.

When the rack is completely loaded, the frame is opposite the front standard 6, and to discharge the corn from the rack it is first necessary to shift the frame still farther forward until it assumes approximately the position shown in Fig. 2 and lies entirely between the front cross-bars 4 and the cross-bars 5, with the roller 75 of its swiveled bracket 73 engaging the guide-track extension 24.

Before driving the machine adjacent to the wire, (not shown,) against which the corn is to be stacked temporarily, the driver grasps the lever 29, and, compressing the lever 34, disengages the spring-actuated dog 30 from the notch 31 and swings the lever to the position shown in dotted lines, Fig. 4, permitting the dog 30 to engage the notch 32. This operation, by shifting the track-section 24 to the position shown in dotted lines, same figure, tilts the frame bodily inward, so as to about equally balance its weight upon the wheeled frame, and this tilting operation is permitted, owing to the comparatively loose engagement of the rollers 67 and 68 with the track 35, as hereinbefore referred to. The machine may now be moved without any undue strain upon the parts opposite the stacking-wire. The driver then dismounts, and, grasping the crank-handle 15, rotates the shaft 14 and winds the cables or cords 12 upon the drums 13, and thereby raises the rack to the position shown in dotted lines by elevating the levers 10, as hereinbefore explained, and shown clearly in dotted lines, Fig. 3. It is held thus because the pawl 16ª engages the ratchet and prevents the back rotation of the shaft 14. When the rack has assumed this position, the corn slides downwardly until its stalks strike the ground at the required point. The rack, being then relieved of most of the weight, is grasped by the attendant and swung pivotally, as indicated by the long dotted arrow, Fig. 3, so as to throw the corn to an upright position and leave it standing against the wire or other support arranged to receive it, as will be readily understood. The rack is next lowered to the position shown in dotted lines, Fig. 3, and then the driver trips the pawl 16ª and permits the rack and its connected parts to resume their original positions. He then swings the frame back to its original position by disengaging the dog 30 from the notch 32 and permitting it to reëngage the notch 31, and grasping the crank-handle 123 shifts the frame back to the rear end of the machine. It is then ready for operation.

From the above description it will be apparent that I have produced a corn-harvesting machine which embodies the advantages enumerated in the statement of invention and which is under perfect control of a single attendant.

It is to be understood, of course, that changes in the form, proportion, detail construction, or arrangement of parts will not be considered a departure from the spirit and scope of the invention.

Having thus described the invention, what I claim as new, and desire to secure by Letters Patent, is—

1. In a corn-harvesting machine, the combination of a wheeled frame, cross-bars thereon, grooved rollers carried by said cross-bars at one side of the frame, a rack resting upon said grooved rollers, levers pivoted to the cross-bars, links connected to the end of the rack upon said rollers, and a rod connecting said links and said levers, and also supporting the opposite end of said rack, substantially as described.

2. In a corn-harvesting machine, the combination of a wheeled frame, cross-bars thereon, grooved rollers at one side of the frame and suitably supported, a rack resting at one end on said grooved rollers, bars pivoted to the rack at said ends and also resting on said grooved rollers, bars pivoted to the cross-bars and to the opposite ends of the bars pivoted to the rack, and means for pivotally operating said last-named bars and thereby moving the rack to an inclined position, substantially as described.

3. In a corn-harvesting machine, the combination of a wheeled frame, grooved rollers carried thereby, levers pivotally mounted upon the frame, links resting upon said grooved rollers, a rod connecting said links and the outer ends of said levers, and a rack resting upon said rod between said links and upon said rollers, and pivotally connected to said links at the ends supported by said rollers, substantially as described.

4. In a corn-harvesting machine, the combination of a wheeled frame, grooved rollers carried thereby at one end, standards erected upon the frame and provided with pulleys, levers pivoted to the frame near the lower ends of the standards, a rod connecting the outer ends of said levers, links mounted pivotally upon said rod and resting upon said grooved rollers, a rack between said links resting upon said rod and said rollers, and pivotally connected to said links at the end supported by said rollers, a shaft provided with winding-drums, flexible connections engaging the said pulleys and connecting the outer ends of said levers with said drums, and means for rotating said shaft and thereby moving the rack to an inclined or tilted position, substantially as described.

5. In a corn-harvesting machine, the combination of a wheeled frame, grooved rollers carried thereby at one side, standards erected upon the frame, and provided with pulleys, levers pivoted to the frame near the lower ends of the standards, a rod connecting the outer ends of said levers, links mounted pivotally upon said rod and resting upon said grooved rollers, a rack between said links resting upon said rod and said rollers, and pivotally connected to said links at the end supported by said rollers, a shaft provided with winding-drums, flexible connections engaging said pulleys and connecting the outer ends of said levers with said drums, means to rotate said shaft, and means to secure it at any point of adjustment desired, substantially as described.

6. In a corn-harvesting machine, the combination of a wheeled frame, a rack mounted thereon, a guide-track upon said rack, a second guide-track carried by said frame below and to one side of the first-named guide-track, a corn cutting and gathering frame mounted adjustably upon said guide-tracks, and means to move said corn cutting and gathering frame forward or backward upon said tracks, substantially as described.

7. In a corn-harvesting machine, the combination of a wheeled frame, a rack mounted thereon, a guide-track upon said rack, a second guide-track carried by the frame below and at one side of the first-named guide-track, a corn cutting and gathering frame mounted upon said guide-tracks, sprocket-wheels suitably supported, an endless chain connecting them and connected to said corn cutting and gathering frame, and means to rotate one of said sprocket-wheels and thereby shift said frame backward or forward upon the track-rails, substantially as described.

8. In a corn-harvesting machine, the combination of a wheeled frame, a rack mounted thereon, a guide-track upon said rack, a second guide-track carried by the frame below and at one side of the first-named guide-track, a corn cutting and gathering frame mounted adjustably upon said guide-tracks, sprocket-wheels suitably supported, an endless chain connecting them and connected to said corn cutting and gathering frame, a shaft provided with a handle journaled at the front end of the wheeled frame, and cog-gearing connecting said shaft and the front sprocket, substantially as and for the purpose described.

9. In a corn-harvesting machine, the combination of a wheeled frame, a swinging frame mounted thereon, a guide-track upon said swinging frame, a second track extending parallel therewith and carried by the wheeled frame, a corn cutting and gathering frame mounted upon said tracks, and means to operate said swinging frame and thereby tilt and more evenly distribute the weight of the corn cutting and gathering frame upon the wheeled frame, for the purpose set forth.

10. In a corn-harvesting machine, the combination of a wheeled frame, transversely-extending bars above the same, rock-arms supporting said bars horizontally, a guide-track supported horizontally by said bars, a second track extending parallel therewith and carried by the wheeled frame, a corn cutting and gathering frame mounted upon said tracks, means to operate said rock-arms and thereby tilt and more evenly distribute the weight of said frame upon the wheeled frame, and means for securing said rock-arms at the required point of adjustment so as to hold the corn cutting and gathering frame reliably in its adjusted position, substantially as described.

11. In a corn-harvesting machine, the combination of a wheeled frame, a longitudinal track carried thereby at one side, a tilting rack upon the frame, a longitudinal track mounted upon the rack, rock-arms suitably supported in advance of the rack, horizontal bars pivotally carried thereby, a track-section mounted upon said bars and normally in alinement with the track-section of the rack, a corn cutting and gathering frame mounted upon the track-rails of the frame and the rack, means for shifting it forward until it is supported upon the track-rails of the frame and said horizontal bars, and means for operating said rock-arms so as to tilt said frame over the wheeled frame and out of the way entirely of the tilting rack, substantially as described.

12. In a corn-harvesting machine, the combination of a wheeled frame, guide-tracks carried thereby, a corn cutting and gathering frame provided with grooved rollers engaging the upper and lower sides of one track, and with a roller engaging the other track to prevent the frame from tilting inward or outward, and means to shift said frame longitudinally upon said track-rails, substantially as described.

13. In a corn-harvesting machine, the combination of a wheeled frame, guide-tracks carried thereby, a corn cutting and gathering frame, rollers journaled thereon and engaging the upper and lower sides of one track-rail, and a bracket swiveled to said frame and projecting downwardly and inwardly and provided with a roller engaging the other track-rail to prevent the frame tilting inwardly or outwardly, with a third track-rail arranged in alinement with the last-named track-rail and adapted to be engaged by the roller of the swiveled bracket, and means to move said last-named track-rail inward and maintain it in a horizontal position at all times, so as to tilt the corn cutting and gathering frame inward over the wheeled frame, substantially as described.

14. In a corn-harvesting machine, the combination of a suitable wheeled frame, with a corn cutting and gathering frame suitably supported at one side of the wheeled frame and comprising bars arranged to form an angular path for the passage of the corn, rotating sprocket-wheels at opposite sides of the mouth of said passage, guide-rollers carried by said bars at opposite sides of the transversely-extending portion of said passage and inward of said sprocket-wheels, a sprocket-chain connecting the inner sprocket-wheel and the guide-rollers at the front side of the transverse portion of said passage, and provided with outwardly-projecting hook-arms, and a second sprocket-chain engaging the outer sprocket-wheel, the guide-rollers at the rear side of the transverse portion of the passage and engaged by the hook-arms of the first chain where it contacts with said first-named chain at the bend of the said passage, substantially as described.

15. In a corn-harvesting machine, the combination of a suitable wheeled frame, with a corn cutting and gathering frame suitably supported at one side of the wheeled frame and comprising bars arranged to form an angular path for the passage of the corn, rotating sprocket-wheels at opposite sides of the mouth of said passage, guide-rollers carried by said bars at opposite sides of the transversely-extending portion of said passage and inward of said sprocket-wheels, a sprocket-chain connecting the inner sprocket-wheel and the guide-rollers at the front side of the transverse portion of said passage, and provided with outwardly-projecting hook-arms, a second sprocket-chain engaging the outer sprocket-wheel, the guide-rollers at the rear side of the transverse portion of the passage and engaged by the hook-arms of the first chain where it contacts with the said first-named chain at the bend of the said passage, forked arms pivoted to the first-named sprocket-wheel, and a cam positioning said arms radially of said wheel, that they may reliably but loosely embrace the upper and lower sides of said chains at the bend of said passage and prevent any possible disengagement thereof, substantially as described.

16. In a corn-harvesting machine, the combination of a suitable wheeled frame, with a corn cutting and gathering frame suitably supported at one side of the wheeled frame and comprising bars arranged to form an angular path for the passage of the corn, rotating sprocket-wheels at opposite sides of the mouth of said passage, guide-rollers carried by said bars at opposite sides of the transversely-extending portion of said passage and inward of said sprocket-wheels, a sprocket-chain connecting the inner sprocket-wheel and the guide-rollers at the front side of the transverse portion of said passage, and provided with outwardly-projecting hook-arms, a second sprocket-chain engaging the outer sprocket-wheel, the guide-rollers at the rear side of the transverse portion of the passage and engaged by the hook-arms of the first chain where it contacts with the said first-named chain at the bend of the said passage, means for cutting the corn as it enters the mouth of said passage, and means for tilting the corn forward with respect to its direction of movement to an approximately horizontal position as it is carried through the transverse portion of the passage, substantially as described.

17. In a corn-harvesting machine, the combination of a wheeled frame, with a corn cutting and gathering frame suitably supported at one side of the wheeled frame, and consisting of bars arranged to form an angular passage, the mouth of said passage being disposed forwardly, and its discharge end transversely of and superposed relatively to the machine, shafts at opposite sides of the mouth of said passage, sprocket-wheels thereon, guide-rollers arranged at the front side of the transverse portion of the passage, a chain connecting the same and the sprocket at the inner side of the passage and provided with outwardly-projecting hook-arms, guide-rollers mounted at the rear side of the transversely-extending portion of said passage, a sprocket-chain engaging said rollers and the sprocket-wheel at the outer side of said passage, and engaged by the hook-arms of the first-named sprocket-chain where it contacts with the said first-named chain at the bend of said passage, a reel mounted upon the shaft of the outer sprocket-wheel, a third shaft journaled in the frame in advance of and in longitudinal alinement with the shaft of the inner sprocket, a reel mounted thereon, a knife for cutting the corn below said reels, mechanism interposed between one drive-wheel of the machine and said inner shafts, for causing the operation of said reels and sprocket-wheels, and means for throwing said mechanism out of gear, substantially as described.

18. In a corn-harvesting machine, the combination of a wheeled frame, parallel track-rails carried thereby, a longitudinal shaft rotating with one of the drive-wheels at the will of the operator, a corn cutting and gathering frame mounted upon said tracks, gear-wheels mounted slidingly and non-rotatably upon said shaft and geared to the mechanism of said corn cutting and gathering frame, a bracket secured to said frame and embracing the opposite sides of said gear-wheels, and means to adjust said frame longitudinally upon said track-rails and thereby also move said gear-wheels upon said shaft so as to keep them always in gear with the mechanism of the corn cutting and gathering frame, substantially as described.

19. In a machine of the character described, the combination of a wheeled frame, and a corn cutting and gathering frame carried thereby, with a supplemental stalk-cutting mechanism, comprising a knife, rods swiveled at their upper ends to said frame and to the opposite ends of said knife, and chains connecting the opposite ends of said knife also with said frame, substantially as described.

20. In a machine of the character described, the combination of a wheeled frame, and a corn cutting and gathering frame mounted thereon, with a stalk-cutting mechanism comprising a knife, rods connected to said knife and swiveled to said corn cutting and gathering frame, brackets secured to said frame and provided each with communicating openings, one opening being larger than the other, and chains secured at their lower ends to said knife, and extending through and engaged by said brackets, substantially as shown and described.

In testimony whereof I affix my signature in presence of two witnesses.

THOMAS D. McGRATH.

Witnesses:
G. Y. THORPE,
M. R. REMLEY.